(No Model.) 2 Sheets—Sheet 1.
T. B. GARRETSON & W. R. THATCHER.
ICE CREAM FREEZER.
No. 462,696. Patented Nov. 10, 1891.
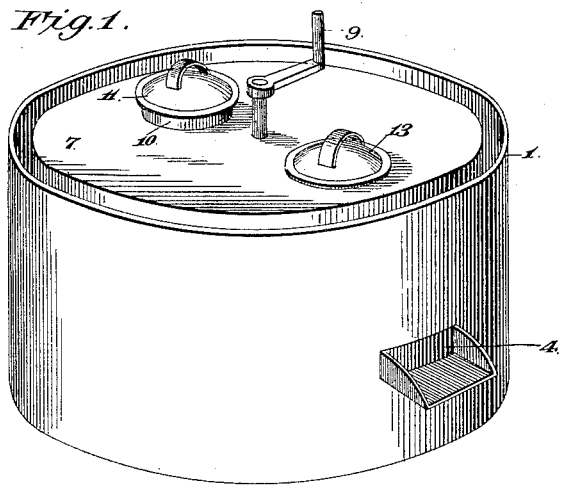
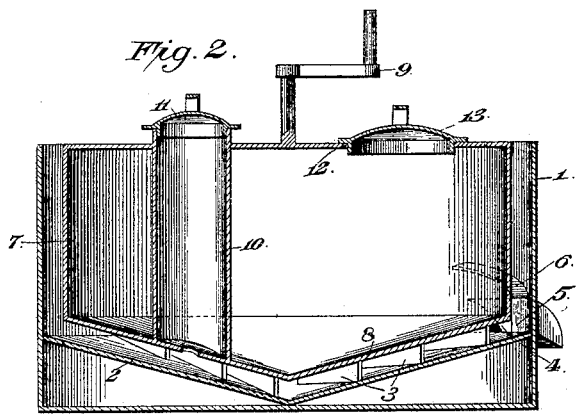
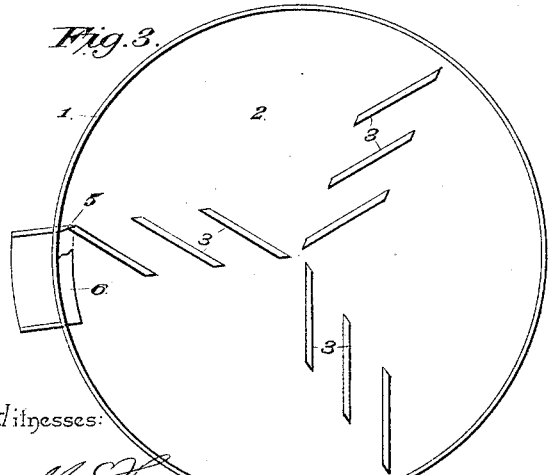
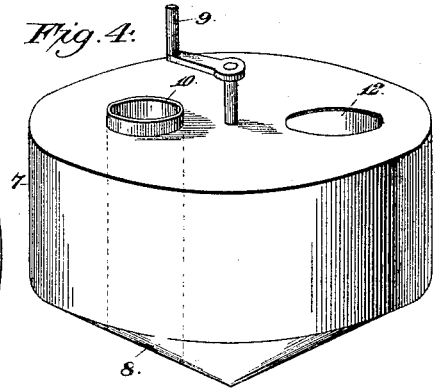
Witnesses:
M. Fowler
W. J. Duvall
Inventors
Walter R. Thatcher
Thomas B. Garretson
By their Attorneys,
C. A. Snow & Co.

(No Model.) 2 Sheets—Sheet 2.
T. B. GARRETSON & W. R. THATCHER.
ICE CREAM FREEZER.
No. 462,696. Patented Nov. 10, 1891.
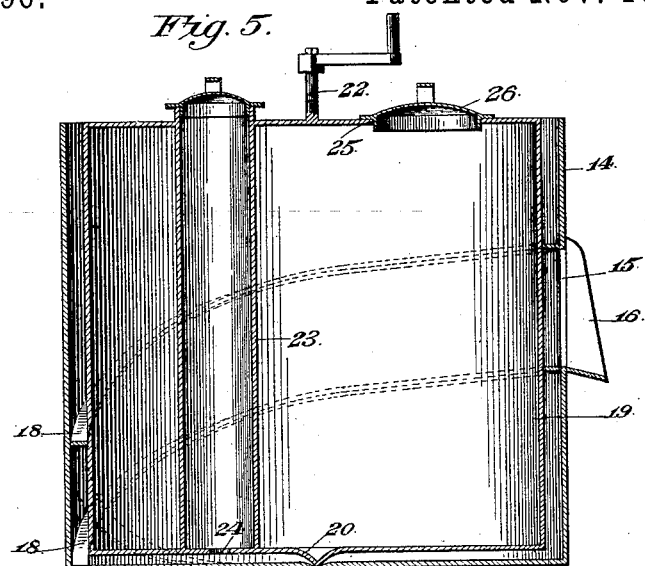
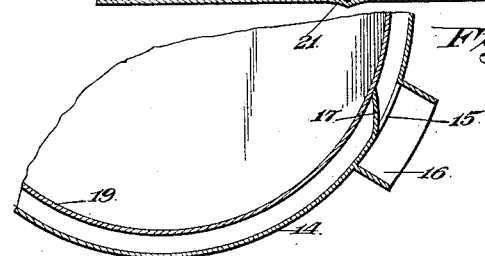
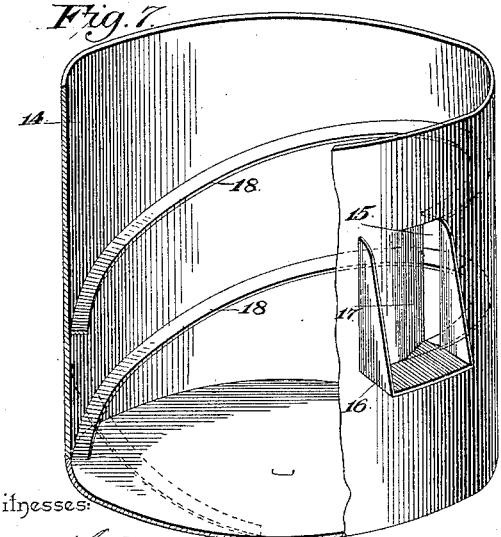
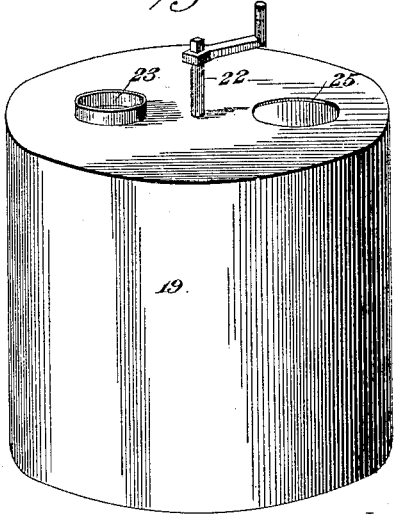
Witnesses:
Inventors
Walter R. Thatcher
Thomas B. Garretson
By their Attorneys,

UNITED STATES PATENT OFFICE.

THOMAS B. GARRETSON AND WALTER R. THATCHER, OF OSKALOOSA, IOWA.

ICE-CREAM FREEZER.

SPECIFICATION forming part of Letters Patent No. 462,696, dated November 10, 1891.

Application filed July 17, 1891. Serial No. 399,837. (No model.)

*To all whom it may concern:*

Be it known that we, THOMAS B. GARRETSON and WALTER R. THATCHER, citizens of the United States, residing at Oskaloosa, in the county of Mahaska and State of Iowa, have invented a new and useful Ice-Cream Freezer, of which the following is a specification.

This invention relates to ice-cream freezers; and the objects in view are to provide a freezer of cheap and simple construction, adapted to quickly, thoroughly, and efficiently, and, if desired, continuously or otherwise, freeze cream, water-ices, custards, &c., and to accomplish the same with little effort and in a small space of time.

With the above general objects in view the invention consists in certain features of construction hereinafter specified, and particularly pointed out in the claims.

Referring to the drawings, Figure 1 is a perspective view of a freezer constructed in accordance with our invention, the same illustrating our preferred construction. Fig. 2 is a vertical longitudinal section. Fig. 3 is a plan of the outer casing. Fig. 4 is a detail in perspective of the inner or freezing cylinder. Fig. 5 is a vertical longitudinal section of a modified construction of freezer. Fig. 6 is a transverse section. Fig. 7 is a detail in perspective of the outer cylinder. Fig. 8 is a similar view of the inner cylinder.

Like numerals of reference indicate like parts in all the figures of the drawings.

In practicing our invention we employ a cylindrical casing 1, which may be formed of metal or other material, and locate within the same a false inverted conical bottom 2. The bottom is provided at intervals with radial rows of tangentially-disposed vertical blades or scrapers 3, each row leading from points near the apex of the cone to near the wall of the casing 1. Each row consists of a series of blades or scrapers, which are spaced apart, are parallel to each other, and tangentially disposed with relation to the bottom. The wall of the casing is provided at the edge of the false bottom 2 with an oblong opening or discharge 4, and at one edge of the same the opening has an inwardly-disposed scraper-blade 5, and above said opening there projects from the wall an inwardly-disposed scraper-blade 6, the same being inclined, as shown, from a point in front of the opening to the rear end thereof.

7 designates the freezing-cylinder, and the same is circular and provided with an inverted-cone-shaped bottom 8, agreeing with the bottom 2 of the casing. The cylinder fits within the casing and is provided upon its upper side, opposite the apex of its bottom, with a cranked handle 9, by which it may be turned within the casing. At one side of its center a tube 10 passes through the cylinder from top to bottom and is open throughout its length and its upper end covered by a removable cover 11. An opening 12 is also formed in the upper side of the freezing-cylinder, the same being covered by a removable cover 13.

In operation the inner cylinder is mounted within the casing, the former having been first filled with the crushed ice or other freezing agent and the top 15 replaced after the introduction of the ice through the opening 12. The cream or other substance to be frozen is introduced into the cylinder 10 and the lid 11 placed in position over the top of the cylinder. The inner cylinder is now revolved through the medium of the crank 9 and the cream passes through the lower end of the cylinder 10 to the bottom of the casing, and as the cylinder is revolved is worked by the bottom of the latter toward the outer edge of the inner cylinder and wall of the casing, the cream being deflected through the blades 3, which also serve to keep the bottom continually scraped. In this manner the frozen cream will be forced out or toward the side wall of the casing, and all soft cream or cream not thoroughly frozen will run back over the conical bottom 2 toward the center thereof, where it is more thoroughly frozen and subsequently forced outwardly toward the side wall of the casing. As the cream freezes and is forced to the outer wall of the casing, it adheres to the outer lower edge of the freezing-cylinder and is scraped therefrom by the scrapers 5 and 6 of the casing, and hence passes out of the discharge-opening 4 into any receptacle located under the opening to receive the same. In this manner any desired quantity of cream may be successfully and efficiently frozen and discharged into waiting receptacles. It will be seen that a thorough freezing of all the cream discharged must take place and that large or small quantities may be frozen equally well, a device thus constructed being specially adapted for use in retail stores, where saucers are successively filled for customers, so that each saucer contains a thoroughly-frozen quantity. The scrapers 3, it will be seen, also serve, in addition to their functions as such, as elevators for directing the cream toward the discharge-opening, while the scrapers 5 and 6 serve to scrape the congealed cream from the sides of the freezing-cylinder and direct the same out of the discharge-opening. It will be seen that the tube 10 may be refilled at intervals, and that the cream will flow through the lower reduced end of the same as long as the freezing-cylinder is rotated.

The hereinbefore-described construction is preferred by us, and yet may be changed and still worked successfully upon the same principle. A common change that may be made we have illustrated in Figs. 5 to 8, which construction we will now proceed to describe in detail.

14 designates the outer casing or cylinder, the same being preferably made of cheap metal, and is provided at one side near its upper end with an oblong discharge-opening 15, one end wall of which is inwardly bent or deflected to form a scraping or delivery blade 17. The opening is surrounded by a discharge or delivery spout 16, which is secured to the exterior of the casing. The inner surface of the wall of the casing is provided with a pair of parallel spiral ribs 18 of a width agreeing with the length of the scraper-blade 17 and combining to form a spiral way which terminates at its lower end at the bottom of the wall of the casing and at its upper end at the discharge-opening in said wall.

19 designates a cylindrical ice-box, or what we term the "freezing-cylinder," and the same fits loosely in the casing 1, the periphery of the cylinder being adapted to run in contact with the inner edges of the flanges 18. The bottom of the cylinder may be provided with a conical lug 20, which bears in the countersunk shallow recess 21, located in the bottom of the casing, while diametrically opposite the lug a stub-shaft 22 is located upon the upper side or head of the cylinder, said shaft being squared at its extremity for the reception of a crank, by which the inner cylinder may be rotated.

Located in the inner cylinder and passing entirely through the same is a cream-tube 23, which latter at its lower end is provided with a reduced cream-discharge 24. The head is also provided with an opening 25, having a removable cover 26, and through the opening the ice or other refrigerating agent is introduced. The inner cylinder is first filled with ice or other refrigerating medium, which is introduced through the opening in the cylinder, after which said opening is covered. As soon as the cylinder becomes cold the soft cream is poured into the tube 23, where it is primarily cooled by the refrigerating agents around the tube and contained within the cylinder. The cream passes in small quantities, when the cylinder is turned, from the cream-tube through the perforation in the bottom thereof and is delivered near the center of the bottom. By revolving the cylinder the cream is thoroughly worked and is gradually fed toward the surrounding wall of the casing, where it adheres to the periphery of the cylinder and is carried by the same until scraped therefrom by the spiral flanges of the casing, and between which the cream is confined and forced up through the way formed by the flanges. When the cream reaches the opening 15, it is deflected by the scraping-blade out of the chute or delivery-spout into any receptacle placed thereunder.

Having described our invention, what we claim is—

1. In an ice-cream freezer, the combination, with the outer casing having a discharge-opening, of the inner freezing-cylinder mounted for revolving in the casing, a cream discharge or feed adapted to deliver cream between the casing and cylinder, and stationary inclined cream-guiding delivery-flanges secured to the outer casing and leading toward the delivery point in the casing, substantially as specified.

2. In an ice-cream freezer, the combination, with the outer cylindrical casing, of the inner rotatable freezing-cylinder, said casing being provided with a discharge-opening having a scraping-blade, a feeding device adapted to feed unfrozen cream to a point between the cylinder and casing, and intermediate stationary inclined cream-guiding flanges for directing the cream toward the discharge-opening of the casing, substantially as specified.

3. In an ice-cream freezer, the combination, with the outer cylindrical casing having a cream-discharging opening and a scraper-blade located adjacent thereto, of an inner freezing-cylinder mounted for rotation in the casing, a cream-feeding tube passing through the cylinder and having a cream-discharge at its lower end, and inclined stationary cream-guiding flanges secured to the interior of the casing and adapted to deflect the cream as frozen toward the discharge of the casing, substantially as specified.

4. In an ice-cream freezer, the combination, with the outer cylindrical casing having a conical bottom and at the edge of the same a discharge, of an inner revoluble freezing-cylinder having a conical bottom and a cream-discharging tube adapted to discharge cream adjacent to the apex of the bottom, substantially as specified.

5. In an ice-cream freezer, the combination, with the outer casing having the conical bottom, the cream-guiding flanges, the discharge-opening, and the scraper-blade located adjacent thereto, of the freezing-cylinder mounted revolubly therein and provided with a conical bottom and a cream-discharge adapted to discharge cream near the apex of the bottom, substantially as specified.

6. In an ice-cream freezer, the combination, with the cylindrical casing having the conical bottom, the series of tangential blades arranged in radial rows, and a cream-discharge having a scraper-blade adjacent thereto, of the revoluble freezing-cylinder mounted in the casing and having the conical bottom and a cream-tube passing through the cylinder and terminating in the feed-opening adjacent to the apex of said conical bottom, substantially as specified.

7. In an ice-cream freezer, the combination, with the cylindrical casing having the conical false bottom, the series of independent tangentially-disposed combined scraper-blades and guides arranged in radial rows upon the bottom, said casing being provided with a discharge-opening at the edge of the bottom, of a vertical scraper-blade at the end of the opening, and an inclined scraper-blade above the opening of the freezing-cylinder revolubly mounted in the outer casing and provided with a corresponding conical bottom, a crank diametrically opposite the apex of the bottom, a cream-tube depending through the cylinder and terminating at its lower end in a reduced feed-opening adjacent to the apex of the bottom, substantially as specified.

In testimony that we claim the foregoing as our own we have hereto affixed our signatures in presence of two witnesses.

THOMAS B. GARRETSON.
WALTER R. THATCHER.

Witnesses:
SETH P. HAWKINS,
C. W. BALLINGER.